June 2, 1953　　　　R. J. HARKENRIDER　　　　2,640,742
TRACTION MOTOR LUBRICATOR
Filed Aug. 10, 1949　　　　　　　　　　　　　3 Sheets-Sheet 1
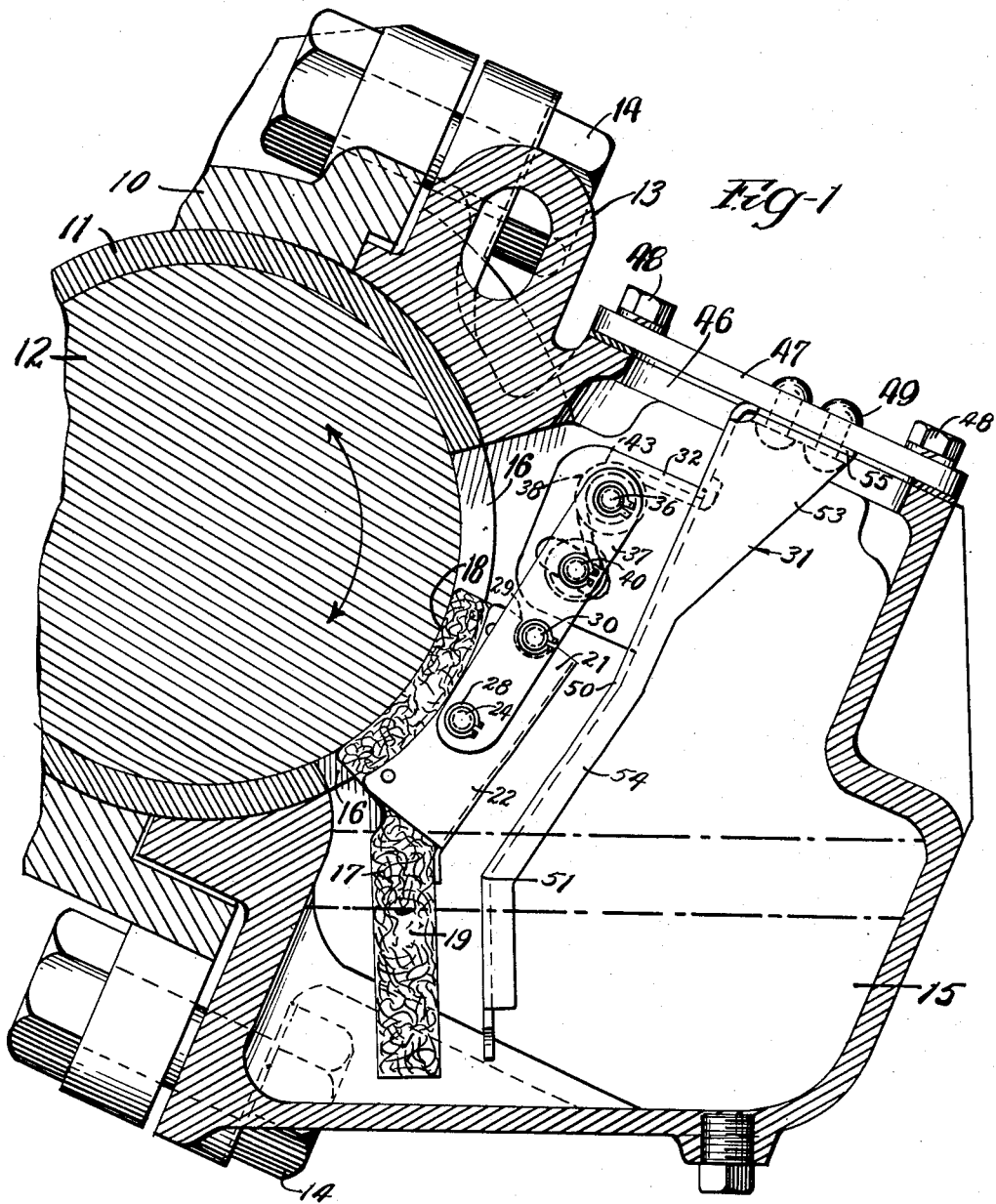
Inventor
Robert J. Harkenrider
By:-
Mann and Brown
Attys.

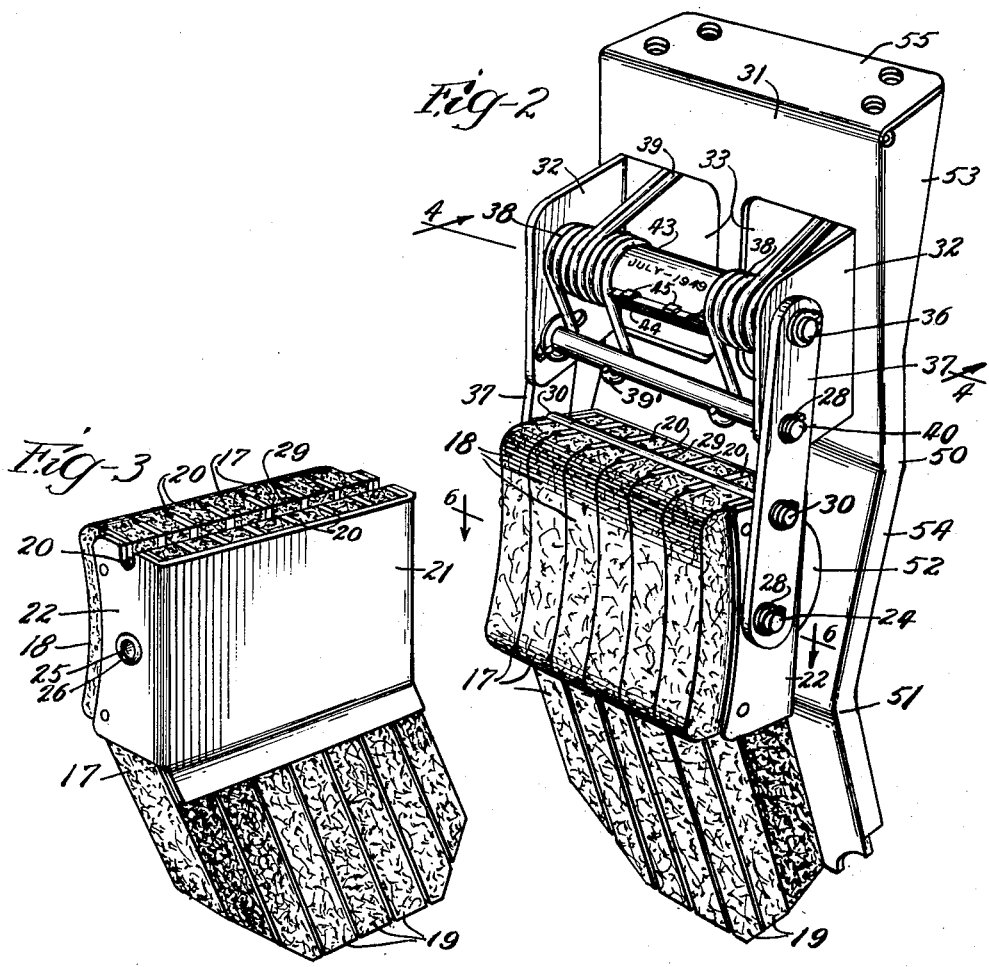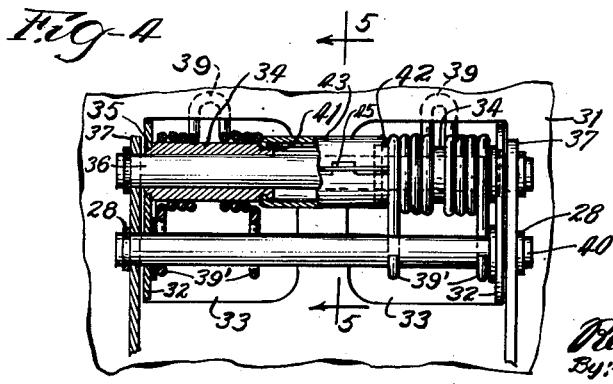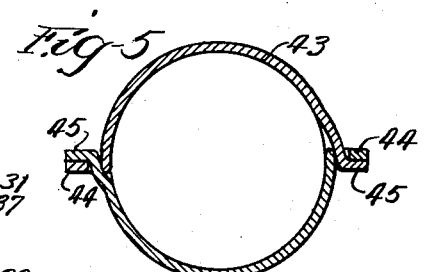

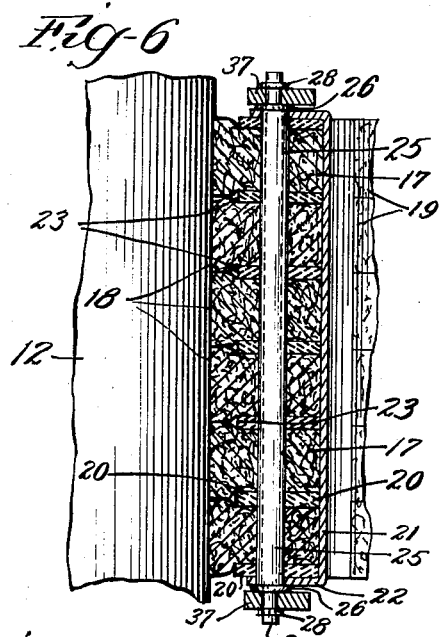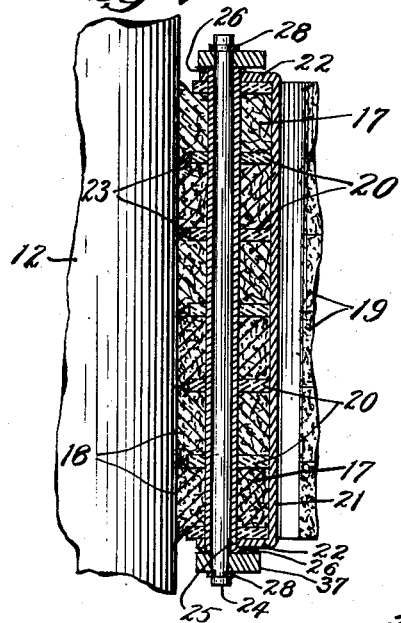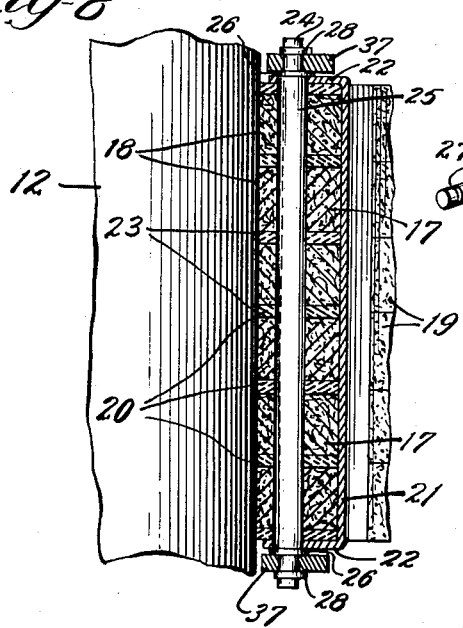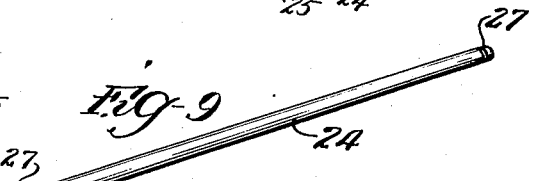

Patented June 2, 1953

2,640,742

UNITED STATES PATENT OFFICE 2,640,742

TRACTION MOTOR LUBRICATOR

Robert J. Harkenrider, Winona, Minn., assignor to Gladys D. Miller, Winona, Minn.

Application August 10, 1949, Serial No. 109,563

5 Claims. (Cl. 308—132)

This invention relates to lubricators particularly suited for traction motor suspension bearings for diesel locomotives, and has for its principal objects to provide a unit felt applicator assembly that can be readily and properly installed by relatively unskilled help, and that will effectively apply copious oil to the journal on which the motor is suspended through a long period of service, and will prevent injurious metal to metal contact as the felt applicator wears away in service.

Generally speaking, this is accomplished by grouping light felt bodies alternating with stop plates of resilient bearing material in a metal holder having side plates to embrace and give lateral support to the group assembly, with the stop plates projecting beyond the metal side pieces to maintain them out of striking contact with the journal and the felt bodies projecting beyond the stop plates for rubbing and patting contact with the journal.

Further objects and advantages of the invention will appear as the disclosure proceeds and the description is read in connection with the accompanying drawings, in which Fig. 1 is a transverse vertical section through a motor suspension bearing and the axle to which it is applied;

Fig. 2 is a perspective view of the lubricator appliance and associated baffle or mounting plate;

Fig. 3 is a perspective view of the lubricator unit assembly, looking at the back;

Fig. 4 is a section taken on the line 4—4 of Fig. 2;

Fig. 5 is a section of the sealing tube taken on the line 5—5 of Fig. 4;

Figs. 6, 7 and 8 are transverse sections taken on the lines 6—6, 7—7 and 8—8 of Fig. 2, showing the applicator in different stages of wear and different positions of use;

Fig. 9 is a perspective view of the pivot rod for the applicator of the unit; and Fig. 10 is a perspective view of one of the end fastenings for the rod shown in Fig. 9.

In Fig. 1 the reference numeral 10 indicates a familiar form of motor suspension bearing provided with a liner or shell 11 forming the actual bearing for the wheeled axle 12. Associated with these is a motor suspension bearing cap or axle cap 13, secured to the motor suspension bearing by bolts 14 and provided with an oil reservoir 15.

The means forming the subject-matter of this invention is to lift oil from the reservoir 15 and apply it to the axle 12 through the window opening 16 in the shell or liner 11. That function is performed by a group of felt bodies each of which includes a pad 17, having a curved surface 18 to bear on the axle 12 and a wick section 19 adapted to extend down into the supply of oil in the reservoir 15 and continuously deliver to the pad section 17 by capillary attraction.

In this embodiment the felt bodies alternate with stop plates 20 of resilient bearing material, and the whole group is assembled in a metal holder 21 of channel shape, providing a base portion and spaced flanges 22 embracing the group and giving lateral support to it.

It is commercially difficult to make a felt pad having sufficient area corresponding to the curved surfaces 18 with the fibers substantially endwise to fit evenly against the axle journal and feed evenly to the surface of the journal in use. For that reason the applicator is made up of a group of felts each including the pad portions 17 which, in the whole, serve to make up an applicator surface of the curved portions 18 suitable for applying lubricant uniformly to the surface of the journal.

While the stop plates 20 actually separate the several felt bodies, the latter project beyond the front edges 23 of the stop plates and expand so as to close the gaps between them and present, for all practical purposes, a uniform applicator surface from one side to the other of the group. It is necessary that the several felt bodies be confined laterally, otherwise they will gradually spread too much; but it is necessary that they be allowed to spread enough to close the gaps and present a substantially continuous application surface.

The channel-shaped holder 21, with its flanges 22, embracing the entire group of pads and stop plates (supplemented by transverse rivets when appropriate), furnishes the appropriate confinement and also a base for mounting the group applicator.

It has been found that felts or felt bodies on the order of $\frac{3}{4}$" to $\frac{15}{16}$" thick are about the most satisfactory, and that exposed portions beyond the stop plates 20 of $\frac{1}{2}$" to $\frac{5}{8}$" will insure a long period of service while reducing the lateral spreading beyond an objectionable amount and allowing enough spreading to make the contact surface of the whole complete and substantially uniform. That provides a surface that will wear about $\frac{1}{16}$" for 100,000 miles of travel against a journal surface that is as smooth as it should be in practice.

The stop plates 20 for such felts may be on the order of $\frac{1}{16}''$ to $\frac{1}{8}''$ thick. They should project beyond the flanges 22 enough to insure that those flanges will never come into striking contact with the journal. One-sixteenth inch to $\frac{1}{8}''$ projection of the stop plates 20 will be sufficient.

It is important to have the felts automatically set against the journal and automatically conform to the surface, irrespective of accumulation of tolerances. To accomplish this the applicator group or unit is pivoted, in this instance on a rod 24 parallel to the journal 12, and having its axis substantially equidistant between the ends of the surfaces 18 intended to bear on the journal. With that arrangement and yielding pressure applied to the group there is a natural tendency for the felts to conform to the surface to be lubricated. In addition, there is a tendency for the entire group to rotate slightly in the opposite direction to the rotation of the journal, due to the tendency of the felt to adhere to the journal as it revolves. That tendency is predominant at the end portion of the felt first presented to the rotating journal, which may be called the leading portion or leading edge. The result is a tendency to increase the pressure between the pad and the journal over a considerable area on one side of the rod 24. There is also a relief of pressure in a corresponding area at the opposite side of the rod 24. Where the pressure is increased there is a surplus of oil ejected or pushed out, and where pressure is decreased that surplus is not wiped off as completely as if there was no pivotal movement allowed. The net result is a greater application of oil to the surface of the journal and a greater proportion left on the surface of the journal that can be had without the pivoting, and careful observation indicates that a lower working temperature results.

The optimum condition for any particular installation will depend upon considerations growing out of it. As a general rule the proportions will be gotten approximately by placing the axis of the rod 24 on a radius from the axis of the journal 12 a distance from the surface 18 related to the length of that surface that will produce the desirable tendency to rotate for the purpose indicated, but will not produce excessive pressures at the leading edge. A ratio of 1 for the shortest line between the axis of the rod 24 and the surface 18 to 3 to 3½ for the length of the surface 18 has been found satisfactory. How far on each side of those limits it would be possible to go depends on the particular material that is involved and other conditions, but a reasonable amount of cut and try will give the answer.

The pivotal mounting is made easy by providing the holder with a bushing 25 extending through the flanges 22, the felt bodies 17 and the stop plates 20, and having its end portions swaged to the flanges 22 at 26.

With such an arrangement an applicator unit or assembly may be readily put in place and made fast by simply inserting the pivot rod 24, which is provided with grooves 27 to receive split fasteners 28 which are simply sprung into place or out of place, as the case may be.

As a rule it will be found desirable to limit the rotation about the rod 24. This is conveniently accomplished by providing the flanges 22, the stop plates 20 and the felts with grooves 29, adapted to receive a limit rod 30 similar to the rod 24 and equipped with similar fasteners. The rod is, of course, of less dimensions than the notches 29 to allow free movement within the desired limits.

It is eminently desirable to have the felt bodies yieldingly pressed against the journal. When a locomotive is operating at high speed, on the order of 90 to 100 miles an hour, there is a terrific vibration of the axles due to irregularities in the track. That vibration, while presenting a problem, also is turned to advantage in lubrication with the present invention, for each vibration effects a momentary compression of the felt bodies followed by a momentary relaxation resulting in expansion. Each compression ejects oil from the pad, and each expansion makes it act like a sponge. In effect the felt assemblies pat the journal as the locomotive runs along.

For many installations the yielding pressure on the applicator is best furnished by mounting it to swing toward the journal in response to spring pressure. In Figs. 1, 2 and 4 the applicator is shown on a mounting plate 31, having spaced flanges 32 formed by striking up the metal from openings 33. Each of those flanges is provided with a tubular bearing or bushing 34 (Fig. 4), having an end portion swaged to the plate at 35. The two bushings are aligned and form a bearing for a pivot rod 36 for two levers 37, through which the rods 24 and 30 pass and by which the applicator is made to swing about the axis of the rod 36.

Each bushing 34 forms a mounting for a torsion spring 38 having its intermediate portion 39 engaging the back side of the mounting plate 31, its coils wound about the bushing 34 and its free end portions 38' engaged with a stop rod 40 passing through the levers 37 and made fast with spring fittings 28.

The torsion springs are easily slipped into position during assembly and will constantly urge the felt assembly or unit toward the axle of the journal with suitable pressure. How much will depend upon the nature of the service, but for a high speed passenger Diesel locomotive intended to run 90 to 100 miles per hour a static pressure on the felts of approximately one-half pound per square inch will be satisfactory. A pressure in the neighborhood of three-quarters to one pound per square inch will be appropriate for a locomotive designed to run at a speed of 60 miles per hour.

The pivotal movement on the levers 37 and the yieldable movement of these levers on the mounting plate makes it easy to slip the device into position within the axle cap and provides for automatic adjustment of the assembly to the journal.

In order to provide a fastening for the springs 38 and a check on their age, the bushings 34 are provided with grooves 41 adapted to receive flanges 42 on the split sealing sleeve 43, the ends of which are provided with perforated flanges 44 adapted to receive ears 45 which may be bent, as shown in Fig. 5, to fasten (or unfasten) the sealing tube on the two bushings by providing that tube with a date. The age of the installation will be constantly recorded.

The axle cap 13 is provided with an inspection opening 46 normally closed by a cover plate 47 secured by bolts 48. The removal of that plate permits inspection of the reservoir 15 and the parts therein, and gives access to the lubricator appliance. It is a great advantage to mount the lubricator appliance on the cover plate 47 to the end that they may be installed and removed by the same operation, and to the end that by merely installing the cover plate and securing it the lubricator appliance will automatically adjust itself in position with respect to the journal in the reservoir.

Where the construction of the axle cap will permit this is advantageously accomplished by securing the mounting plate 31 of the lubricator appliance to the cover plate 47. In the present instance the mounting plate 31 is provided with a right angle flange 55 fastened to the cover plate 47 by rivets 49. The plate mounting 31 is shown in the form of a baffle, bent at 50 and 51 and provided with openings 52 to allow some flow of oil while retaining control of the oil in the reservoir 15. The sides of the baffle plate are turned around to form gussets 53 and flanges 54.

When an appliance has been in service sufficient to make it appropriate to replace the applicator unit, the cover plate 47 may be removed, and with it the entire appliance. One of the spring fastenings 28 may be removed from the rod 24 and the unit wick assembly removed and replaced by a new one properly saturated and protected during transit and handling by a sealed envelope of one of the many so-called plastic materials of the vinyl base.

A unit assembly having been made up under factory conditions, saturated and sealed, it is practically certain that the maintenance man will get it into the assembly in the intended condition, and since the operation is simple the change may be called foolproof.

The wick assembly provides its own stop when the wear life of the felt has been exhausted. The stop plates 20 assure that and prevent any metal to metal contact between the flanges 22 of the holder and the journal. The stopping is entirely independent of the thickness of the bearing liner 11, which varies in maintenance. The plates insure the same protection, regardless of the wear on the liner or the change in its thickness or variations in the journal.

Those stop plates are best made of resilient bearing material that will not injure the journal when the wear permits them to come in contact with it during the terrific vibrations that take place at high speed. They advantageously are sufficiently resilient to bounce quickly away from the journal when brought into contact with it by the violent movement of the axle. This will take place during the high speed operation when the wear is little if anything more than shown in Fig. 7, as well as when the wear has approached that shown in Fig. 8. The quick rebound of those stop plates assist in yielding oil from the felt and applying it to the journal.

They also serve to compress the adjacent portions of the pads when the wear is no more than is indicated in Fig. 6, and thus assist in forcing oil out of the felt as the applicator vibrates and pats the journal.

A composite material commonly known as Micarta, produced by Westinghouse Electric & Mfg. Co., is satisfactory. It is composed of sheets of fabric dipped in a phenol-formaldehyde resin brought together and cured under heat and pressures. The material is well known in industry, and specific description of the composition and variations would seem unnecessary.

A similar material produced by General Electric Company is known as Textolite. Another produced by National Vulcanized Fibre Co. is called Phenolite. They illustrate a large class of laminated molded plastics of fabric base suitable for stop plates.

Hardwoods, such as arbor vitae and maple, will be found satisfactory.

I claim:

1. In a traction motor lubricator, a laminated applicator including a holder having side pieces and between them a group of felt bodies and stop plates of resilient bearing material with the stop plates projecting beyond the side pieces and the felt bodies projecting beyond the stop plates for rubbing contact with the journal, and a bushing through the side pieces, the felt bodies and the stop plates.

2. In a traction motor lubricator, a laminated applicator including a holder having side pieces and between them a group of felt bodies and stop plates of Micarta with the stop plates projecting beyond the side pieces and the felt bodies projecting beyond the side plates for rubbing contact with the journal, and fastening means through the side pieces, the felt bodies, and the stop plates.

3. In a traction motor lubricator, a metal holder including a backing plate and side pieces, a group of felt bodies, and resilient stop plates on the backing plate with the stop plates projecting beyond the side pieces and the felt bodies projecting beyond the stop plates for rubbing contact with the journal, and hinge means on the holder for mounting the assembly.

4. In a traction motor lubricator, a metal holder including a backing plate and side pieces, a group of felt bodies, resilient stop plates on the backing plate with the stop plates projecting beyond the side pieces and the felt bodies projecting beyond the stop plates for rubbing contact with the journal, and fastening means through the side pieces, the felt bodies and the stop plates, said felt bodies having depending wick portions and said backing plate having a depending portion extending along the wick portion.

5. In a traction motor lubricator, a laminated applicator including a channel-shaped holder having side pieces and between them a group of felt bodies spaced by stop plates of a resilient bearing material, with the stop plates extending beyond the side pieces and the felt bodies extending beyond the stop plates for contact with the journal.

ROBERT J. HARKENRIDER.

References Cited in the file of this patent

UNITED STATES PATENTS

| Number | Name | Date |
|---|---|---|
| 356,272 | Buffum | Jan. 18, 1887 |
| 917,412 | Claypoole | Apr. 6, 1909 |
| 1,062,976 | Jackson | May 27, 1913 |
| 1,745,860 | Noble | Feb. 4, 1930 |
| 1,838,652 | Bereit | Dec. 29, 1931 |
| 2,013,359 | Miller | Sept. 3, 1935 |
| 2,249,472 | Hanna | July 15, 1941 |
| 2,348,911 | Korn | May 16, 1944 |
| 2,402,254 | Maddock et al. | June 18, 1946 |
| 2,427,701 | Ballard | Sept. 23, 1947 |
| 2,449,894 | Hennessy | Sept. 21, 1948 |
| 2,540,829 | Miller | Feb. 6, 1951 |